US011783808B2

(12) United States Patent
Kong et al.

(10) Patent No.: US 11,783,808 B2
(45) Date of Patent: Oct. 10, 2023

(54) AUDIO CONTENT RECOGNITION METHOD AND APPARATUS, AND DEVICE AND COMPUTER-READABLE MEDIUM

(71) Applicant: Beijing Bytedance Network Technology Co., Ltd., Beijing (CN)

(72) Inventors: Yalu Kong, Beijing (CN); Yi He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/985,795

(22) Filed: Nov. 11, 2022

(65) Prior Publication Data
US 2023/0091272 A1 Mar. 23, 2023

Related U.S. Application Data

(63) Continuation of application No. PCT/CN2021/110849, filed on Aug. 5, 2021.

(30) Foreign Application Priority Data

Aug. 18, 2020 (CN) .......................... 202010829371.6

(51) Int. Cl.
*G10L 15/08* (2006.01)
*G10L 15/00* (2013.01)
(Continued)

(52) U.S. Cl.
CPC .......... *G10L 15/083* (2013.01); *G10L 15/005* (2013.01); *G10L 15/20* (2013.01); *G10L 15/22* (2013.01); *G10L 2015/223* (2013.01)

(58) Field of Classification Search
CPC ..... G10L 15/083; G10L 15/005; G10L 15/20; G10L 15/22; G10L 2015/223;
(Continued)

(56) References Cited

U.S. PATENT DOCUMENTS 8,606,581 B1 12/2013 Quast et al.
2002/0010916 A1* 1/2002 Thong .................... H04N 5/278
725/1

(Continued)

FOREIGN PATENT DOCUMENTS

CN 1662956 A 8/2005
CN 1746973 A 3/2006
(Continued)

OTHER PUBLICATIONS

International Patent Application No. PCT/CN2021/110849; Int'l Search Report; dated Nov. 4, 2021; 2 pages.

*Primary Examiner* — Abul K Azad
(74) *Attorney, Agent, or Firm* — BakerHostetler (57) ABSTRACT

Embodiments of the present disclosure disclose an audio content recognition method and apparatus, an electronic device and a non-transitory computer-readable medium. A specific implementation of the method includes: obtaining a voice fragment collection and a non-voice fragment collection by segmenting audio; determining a type and language information of each voice fragment in the voice fragment collection; obtaining, for each voice fragment in the voice fragment collection, a first recognition result by performing voice recognition on the voice fragment based on the type and the language information of the voice fragment. In the implementation, speaking and music fragments in the audio are recognized by different models, so that two audio contents may both have better recognition effects. Moreover, audio of different language contents is recognized by using different models, thereby further improving a voice recognition effect.

16 Claims, 5 Drawing Sheets

(51) Int. Cl.
  *G10L 15/20*    (2006.01)
  *G10L 15/22*    (2006.01)
(58) Field of Classification Search
  CPC .................. G10L 15/04; H04N 21/233; H04N 21/234336; H04N 21/439; H04N 21/440236
  USPC ........................................ 704/208, 214, 277
  See application file for complete search history.

(56) References Cited

U.S. PATENT DOCUMENTS

| | | |
|---|---|---|
| 2003/0236663 A1 | 12/2003 | Dimitrova et al. |
| 2006/0053009 A1 | 3/2006 | Jeong et al. |
| 2009/0112599 A1 | 4/2009 | Ljolje |
| 2017/0316792 A1* | 11/2017 | Chaudhuri .............. G10L 25/87 |
| 2018/0150605 A1 | 5/2018 | Co et al. |
| 2020/0160845 A1* | 5/2020 | Lavilla .................. G10L 15/005 |

FOREIGN PATENT DOCUMENTS

| | | | |
|---|---|---|---|
| CN | 102881309 A | | 1/2013 |
| CN | 103714812 A | | 4/2014 |
| CN | 105845129 A | | 8/2016 |
| CN | 105895078 A | | 8/2016 |
| CN | 106878805 A | * | 6/2017 |
| CN | 106878805 A | | 6/2017 |
| CN | 107437416 A | | 12/2017 |
| CN | 109147771 A | | 1/2019 |
| CN | 110349564 A | | 10/2019 |
| CN | 110728976 A | | 1/2020 |
| CN | 111243595 A | | 6/2020 |
| CN | 111986655 A | | 11/2020 |
| JP | 2010-091675 A | | 4/2010 |

* cited by examiner

AUDIO CONTENT RECOGNITION METHOD AND APPARATUS, AND DEVICE AND COMPUTER-READABLE MEDIUM

CROSS-REFERENCE

The disclosure is a continuation of PCT application Ser. No. PCT/CN2021/110849, titled "AUDIO CONTENT RECOGNITION METHOD AND APPARATUS, AND DEVICE AND COMPUTER-READABLE MEDIUM", filed on Aug. 5, 2021, based on a Chinese patent application with the application number of 202010829371.6, filed on Aug. 18, 2020 and titled "AUDIO CONTENT RECOGNITION METHOD AND APPARATUS, AND DEVICE AND COMPUTER-READABLE MEDIUM", and claims the priority of the Chinese patent application, the disclosures of which are hereby incorporated by reference in their entireties.

FIELD

Embodiments of the present disclosure relate to the technical field of computers, in particular to an audio content recognition method and apparatus, a device and a non-transitory computer-readable medium.

BACKGROUND

In order to improve the watching video experience of users, subtitles need to be added for a video. As for artificial subtitle adding, a cost is high, and an efficiency is limited. For an existing automatic subtitle adding technology, an accuracy cannot be guaranteed when there are various contents in audio. The various contents in the audio include singing, speaking voices, coughs, laughs and door closing sounds. Moreover, audio with fragments in multiple languages is difficult to handle.

SUMMARY

The content section of this disclosure is used to present ideas in a brief form that will be described in detail in the specific embodiments section that follows. The content portion of this disclosure is not intended to identify key features or essential features of the claimed technical solution, nor is it intended to limit the scope of the claimed protected technical solution.

Some embodiments of the present disclosure propose audio content recognition method and apparatus, a device and a non-transitory computer-readable medium to solve the technical problems mentioned in the background above.

In a first aspect, some embodiments of the present disclosure provide an audio content recognition method, comprising: obtaining a voice fragment collection and a non-voice fragment collection by segmenting audio; determining a type and language information of each voice fragment in the voice fragment collection; and obtaining, for each voice fragment in the voice fragment collection, a first recognition result by performing voice recognition on the voice fragment based on the type and the language information of the voice fragment.

In a second aspect, some embodiments of the present disclosure provide an audio content recognition apparatus, comprising: a segmenting unit, configured to segment audio to obtain a voice fragment collection and a non-voice fragment collection; a first determining unit, configured to determine a type and language information of each voice fragment in the voice fragment collection; and a recognition unit, configured to, for each voice fragment in the voice fragment collection, perform voice recognition on the voice fragment based on the type and the language information of the voice fragment.

In a third aspect, some embodiments of the present disclosure provide an electronic device, comprising: one or more processors; and a storage apparatus, where one or more programs are stored; wherein the one or more programs, when executed by the one or more processors, enable the one or more processors to implement the method according to any one of the first aspect above.

In a forth aspect, some embodiments of the present disclosure provide a non-transitory computer-readable medium, storing a computer program thereon, wherein the program, when executed by a processor, implements the method according to any one of the first aspect above.

One of the above embodiments of the present disclosure has the following beneficial effects: by recognizing speaking and music fragments in audio respectively, two audio contents may both obtain a better recognition effect. Moreover, a voice recognition effect is further improved by recognizing audio with contents in different languages.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended markings indicate identical or similar elements. It should be understood that the accompanying drawings are schematic and that the originals and elements are not necessarily drawn to scale.

DETAILED DESCRIPTION OF THE EMBODIMENTS

Embodiments of the present disclosure will be described in greater detail below with reference to the accompanying drawings. While certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for exemplary purposes only and are not intended to limit the scope of protection of the present disclosure.

It is also noted that, for ease of description, only those portions of the accompanying drawings are shown that relate to the invention in question. The embodiments and the features in the embodiments of the present disclosure may be combined with each other without conflict.

It should be noted that the concepts of "first" and "second" mentioned in this disclosure are used only to distinguish between different devices, modules or units, and are not intended to define the order or interdependence of the functions performed by these devices, modules or units.

It should be noted that the modifications of "one" and "more than one" referred to in this disclosure are illustrative rather than limiting, and it should be understood by those skilled in the art to mean "one or more" unless the context clearly indicates otherwise.

The names of the messages or information interacted between the plurality of devices in this implementation of the disclosure are used for illustrative purposes only and are not intended to limit the scope of those messages or information.

The present disclosure will be described in detail below with reference to the accompanying drawings and in conjunction with embodiments.

Figure 1:
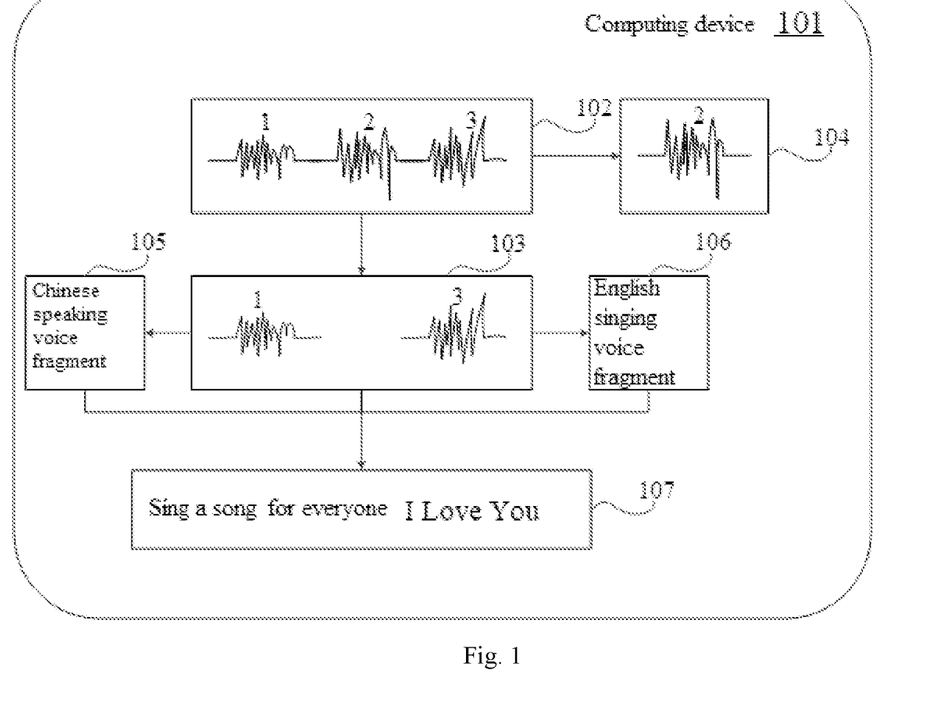
FIG. 1 is a schematic diagram of an application scenario of an audio content recognition method according to some embodiments of the present disclosure.

FIG. 1 illustrates a schematic diagram of an application scenario where an audio content recognition method of some embodiments of the present disclosure may be applied.

In the application scenario shown in FIG. 1, first, a computing device 101 may segment audio 102 to obtain a voice fragment collection 103 and a non-voice fragment collection 104. In the application scenario, the audio includes three audio fragments which are numbered as 1, 2 and 3, wherein the audio fragments numbered as 1 and 3 are voice fragments, and the audio fragment numbered as 2 is a non-voice fragment. Then, a type and language information of each voice fragment in the above voice fragment collection 103 are determined. In the application scenario, the types include a speaking voice fragment and a singing voice fragment. The audio fragment numbered as 1 is a Chinese speaking voice fragment, as shown in mark 105 in the drawings. The audio fragment numbered as 3 is an English singing voice fragment, as shown in mark 106 in the drawings. At last, the above computing device 101 may perform voice recognition on each voice fragment in the above voice fragment collection 103 based on the types and the language information 105 and 106 of the above voice fragments, so as to obtain a first recognition result 107.

It should be noted that, the above computing device 101 may be hardware or may be software. When the computing device is hardware, a distributed cluster composed of a plurality of servers or electronic devices may be implemented, or a single server or a single electronic device may also be implemented. When the computing device is embodied as software, a plurality of pieces of software or software modules used for providing distributed services may be implemented, or a single piece of software or software module may also be implemented, which is not limited herein.

It should be understood, a quantity of the computing device 101 in FIG. 1 is only schematic. There may be computing devices 101 in any quantity according to demands.

Figure 2:
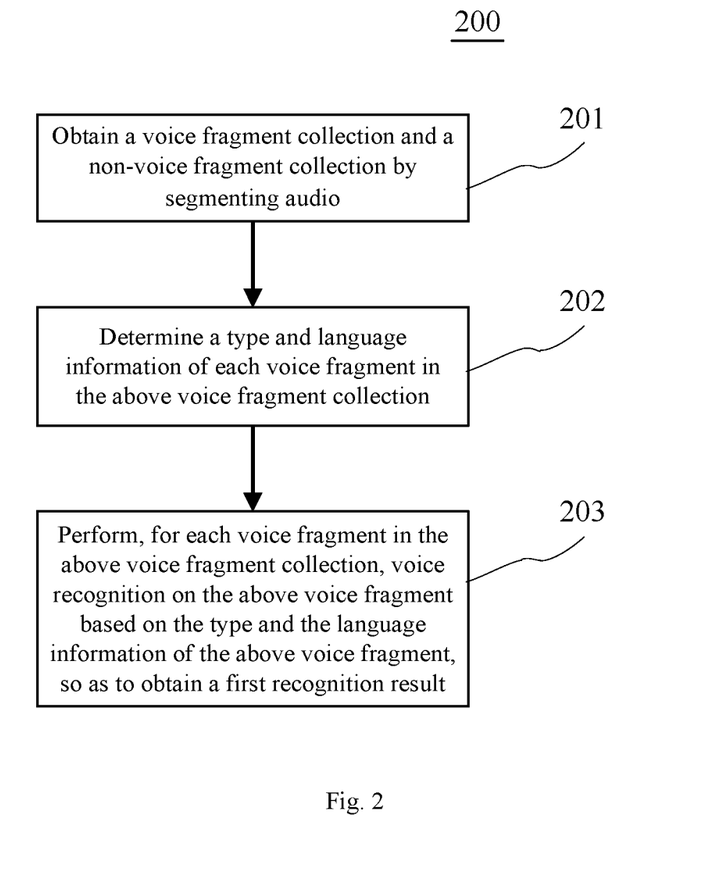
FIG. 2 is a flow diagram of some embodiments of an audio content recognition method according to the present disclosure.

Further referring to FIG. 2, a flow 200 of some embodiments of an audio content recognition method according to the present disclosure is illustrated, and the audio content recognition method includes the following steps:

Step 201: a voice fragment collection and a non-voice fragment collection are obtained by segmenting audio.

In some embodiments, an executive body (such as the computing device shown in FIG. 1) of the audio content recognition method may segment the above audio by using voice recognition software or an online voice recognition tool, so as to obtain the voice fragment collection and the non-voice fragment collection.

In some embodiments, the above executive body may also use a voice activation detection (VAD) technology to segment the audio, so as to obtain the voice fragment collection and the non-voice fragment collection.

In optional implementations of some embodiments, the above executive body may input the above pre-obtained audio into a pre-trained voice activation detection model, so as to obtain the above voice fragment collection and the non-voice fragment collection.

Step 202, a type and language information of each voice fragment in the above voice fragment collection are determined.

In some embodiments, the types of the above voice fragments may include at least one of: a laugh voice fragment, a natural sound voice fragment and a speaking voice fragment.

In some optional implementations of some embodiments, the types of the above voice fragment may also include at least one of: an onomatopoeia voice fragment, a speaking voice fragment and a singing voice fragment.

In some embodiments, the executive body of the audio content recognition method may determine the type and the language information of each voice fragment in the above voice fragment collection by using the voice recognition software or the online voice recognition tool.

In some embodiments, the above executive body may also determine the type of each voice fragment in the above voice fragment collection by using an activity event detection (AED) technology; and determine the language information of each voice fragment in the above voice fragment collection by using a language identification (LID) technology.

In some optional implementations of some embodiments, the above executive body may input the above voice fragments into a pre-trained activity event detection model, so as to obtain the types of the above voice fragments; and input the above voice fragments into a pre-trained language identification model, so as to obtain the language information of the above voice fragments.

Step 203, for each voice fragment in the above voice fragment collection, a first recognition result is obtained by performing voice recognition on the voice fragment based on the type and the language information of the voice fragment.

In some embodiments, the above executive body may input voice fragments of different types and languages into different voice recognition software models for recognition.

In some optional implementations of some embodiments, the above executive body may first, for each voice fragment in the voice fragment collection, determine a voice recognition model used for recognizing the above voice fragments based on the type and the language information of the voice fragment in a preset voice recognition model collection. Then, the above voice fragments are input into the voice recognition model used for recognizing the above voice fragments, so as to obtain the first recognition result.

In a method provided by some embodiment of the present disclosure, speaking and music fragments in the audio are recognized by different models, so that two audio contents both may get a better recognition effect. Moreover, the voice recognition effect is further improved by using different models to recognize audio of different language contents.

Figure 3:
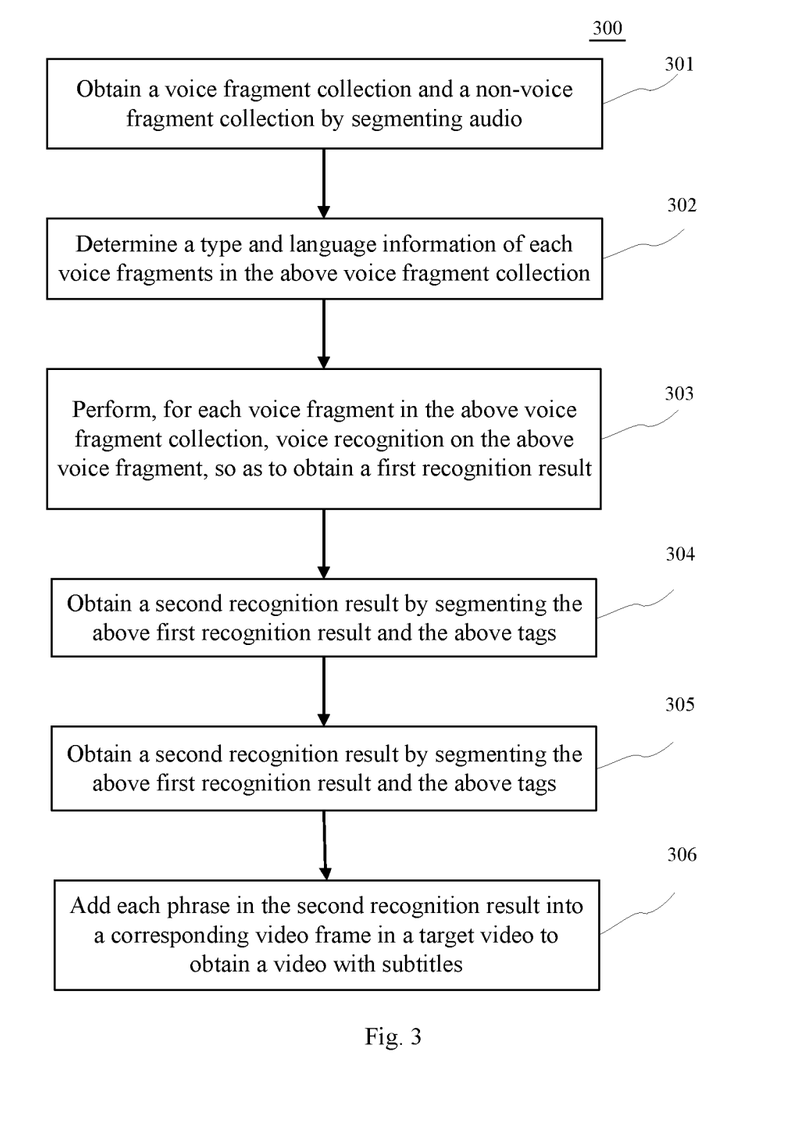
FIG. 3 is a flow diagram of other embodiments of an audio content recognition method according to the present disclosure.

Further referring to FIG. 3, a flow 300 of other embodiments of the audio content recognition method is illustrated. The flow 300 of the audio content recognition method includes the following steps:

Step 301, a voice fragment collection and a non-voice fragment collection are obtained by segmenting audio.

Step 302, a type and language information of each voice fragment in the above voice fragment collection are determined.

Step 303, for each voice fragment in the above voice fragment collection, a first recognition result is obtained by performing voice recognition on the above voice fragment based on the type and the language information of the above voice fragment.

In some embodiments, for specific implementation of steps 301-303 and technical effects brought thereby, reference may be made to steps 201-203 in corresponding embodiments in FIG. 2, which is not repeated herein.

Step 304, a tag of each non-voice fragment in the above non-voice fragment collection is determined.

In some embodiments, the above executive body may determine the tag of each non-voice fragment in the above non-voice fragment collection by using audio recognition software or an online audio recognition tool.

In some embodiments, the executive body also may determine the tag of each non-voice fragment in the above non-voice fragment collection by using an activity event to detect a network.

Step 305, a second recognition result is obtained by phrasing the first recognition result and the above tags.

In some embodiments, the above first recognition result and occurrence time of the above tags in the audio according to the corresponding audio fragments constitute a to-be-phrased text.

In some embodiments, the above executive body may phrase the first recognition result and the above tags by using phrasing software or an online phrasing tool.

In some embodiments, the above executive body also may phrase the first recognition result and the above tags by using a phrasing network.

In some embodiments, the executive body also may phrase the first recognition result and the above tags by receiving artificial input.

Step 306, a video with subtitles is obtained by adding each phrase in the above second recognition result into a corresponding video frame in a target video.

In some embodiments, each phrase in the second recognition result corresponds to at least one video frame in the above target video according to a starting time and an ending time of the corresponding audio fragment in the audio.

As shown in FIG. 3, compared with description of some embodiments corresponding to FIG. 2, the flow 300 of the audio content recognition method of some embodiments corresponding to FIG. 3 represents the steps of determining the tags of the non-voice fragments, phrasing the first recognition result and the tags and adding the second recognition result into the video. Thus, solutions described in these embodiments may enable the generated subtitles to contain the tags of the non-voice fragments. Moreover, by phrasing the first recognition results and the tags, the results of audio recognition may be better shown in the video. Generally, the experience of a user watching the video is further improved.

Figure 4:
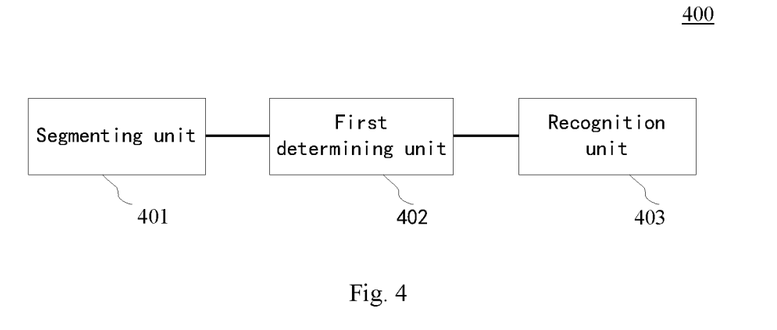
FIG. 4 is a structural schematic diagram of some embodiments of an audio content recognition apparatus according to the present disclosure.

Further referring to FIG. 4, as implementation of the method shown in the above drawings, the present disclosure provides some embodiments of an audio content recognition apparatus, these embodiments of the apparatus correspond to those method embodiments shown in FIG. 2, and the apparatus may specifically be applied to various electronic devices.

As shown in FIG. 4, the audio content recognition apparatus 400 of some embodiments includes: a segmenting unit 401, a first determining unit 402 and a recognition unit 403. The segmenting unit 401 is configured to segment audio, so as to obtain a voice fragment collection and a non-voice fragment collection; the first determining unit 402 is configured to determine a type and language information of each voice fragment in the above voice fragment collection; and the recognition unit 403 is configured to, for each voice fragment in the above voice fragment collection, perform voice recognition on the above voice fragments based on the types and the language information of the above voice fragments, so as to obtain a first recognition result.

In optional implementations of some embodiments, the apparatus 400 further includes: a second determining unit, configured to determine a tag of each non-voice fragment in the above non-voice fragment collection; and a phrasing unit, configured to phrase the first recognition result and the above tags, so as to obtain a second recognition result.

In optional implementations of some embodiments, the apparatus 400 further includes: an adding unit, configured to add each phrase in the second recognition result into a corresponding video frame of a target video, so as to obtain a video with subtitles.

In optional implementations of some embodiments, the phrasing unit 401 is further configured to: input the above pre-obtained audio into a pre-trained voice activation detection model, so as to obtain the above voice fragment collection and the non-voice fragment collection.

In optional implementations of some embodiments, the types of the above voice fragments include at least one of: an onomatopoeia voice fragment, a speaking voice fragment and a singing voice fragment.

In optional implementations of some embodiments, the first determining unit 402 is further configured to: input the above voice fragments into a pre-trained activity event detection model to obtain the types of the above voice fragments; and input the above voice fragments into a pre-trained language identification model to obtain the language information of the above voice fragments.

In optional implementations of some embodiments, the recognition unit 403 is further configured to: for each voice fragment in the above voice fragment collection, based on the type and the language information of the above voice fragment, determine a voice recognition model used for recognizing the above voice fragment in a preset voice recognition model collection; and input the above voice fragment to the voice recognition model used for recognizing the above voice fragment to obtain the first recognition result.

In optional implementations of some embodiments, the second determining unit is further configured to: input each non-voice fragment in the above non-voice fragment collection into a pre-trained voice event detection model to obtain a tag of the above non-voice fragment.

Figure 5:
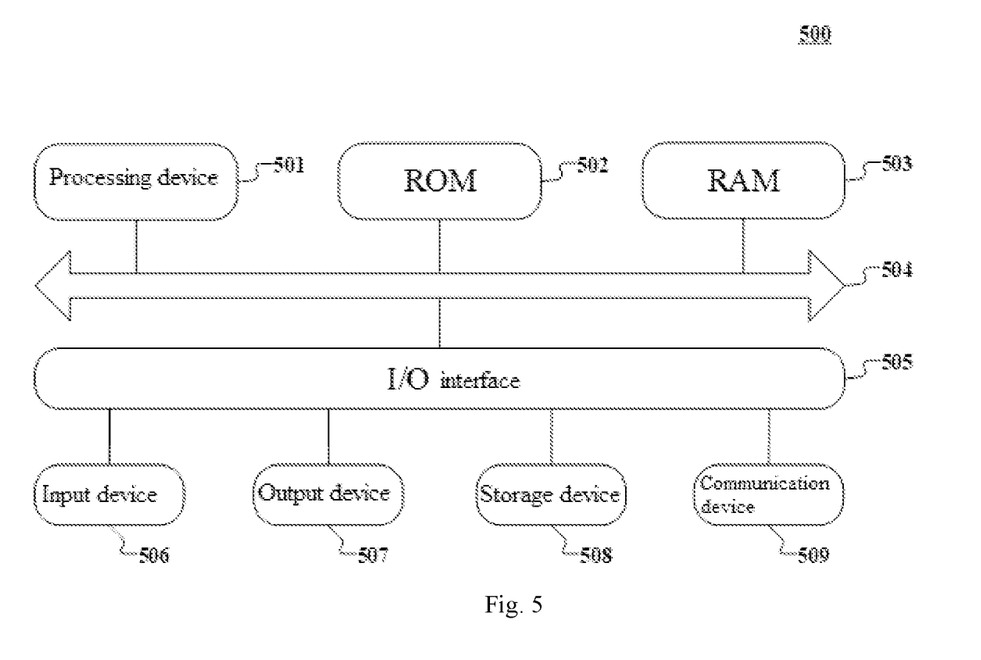
FIG. 5 is a structural schematic diagram of an electronic device of some embodiments suitable for implementing the present disclosure.

It may be understood that all units recorded in the apparatus 400 correspond to all steps in the method described referring to FIG. 2. Accordingly, operations, features and produced beneficial effects described according to the method above are similarly applicable to the apparatus 400 and the units contained thereby, which will not be repeated herein. Reference is made below to FIG. 5, which illustrates a schematic diagram of the structure of an electronic device (e.g., the server or terminal device in FIG. 1)

500 suitable for use in implementing some embodiments of the present disclosure. Electronic devices in some embodiments of the present disclosure may include, but are not limited to, mobile terminals such as cell phones, laptop computers, digital broadcast receivers, PDAs (personal digital assistants), PADs (tablet computers), PMPs (portable multimedia players), vehicle terminals (e.g., vehicle navigation terminals), and the like, and fixed terminals such as digital TVs, desktop computers, and the like. The electronic device illustrated in FIG. 5 is only an example and should not impose any limitations on the functionality and scope of use of embodiments of the present disclosure.

As shown in FIG. 5, the electronic device 500 may include a processing device (e.g., central processor, graphics processor, etc.) 501 that may perform various appropriate actions and processes based on a program stored in a read-only memory (ROM) 502 or loaded from a storage device 508 into a random access memory (RAM) 503. In RAM 503, various programs and data required for the operation of electronic device 500 are also stored. The processing device 501, ROM 502, and RAM 503 are connected to each other via bus 504. The input/output (I/O) interface 505 is also connected to the bus 504.

Typically, the following devices can be connected to the I/O interface 505: input devices 506 including, for example, a touch screen, touch pad, keyboard, mouse, camera, microphone, accelerometer, gyroscope, etc.; output devices 507 including, for example, liquid crystal displays (LCDs), speakers, vibrators, etc.; storage devices 508 including, for example, magnetic tapes, hard drives, etc.; and communication devices 509. communication devices 509 may allow the electronic device 500 to communicate wirelessly or wired with other devices to exchange data. While FIG. 5 illustrates the electronic device 500 with various devices, it should be understood that it is not required to implement or have all of the devices illustrated. More or fewer devices may alternatively be implemented or available. Each box illustrated in FIG. 5 may represent one device, or multiple devices as desired.

In particular, according to some embodiments of the present disclosure, the process described above with reference to the flowchart may be implemented as a computer software program. For example, some embodiments of the present disclosure include a computer program product comprising a computer program carried on a computer readable medium, the computer program comprising program code for performing the method shown in the flowchart. In some such embodiments, the computer program may be downloaded and installed from a network via a communication device 509, or from a storage device 508, or from a ROM 502. When this computer program is executed by processing device 501, it performs the above-described functions as defined in the methods of some embodiments of the present disclosure.

It is noted that the non-transitory computer-readable medium described in some embodiments of the present disclosure may be a computer-readable signal medium or a computer-readable storage medium or any combination of the foregoing. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In some embodiments of the present disclosure, the computer readable storage medium may be any tangible medium that contains or stores a program that may be used by or in combination with an instruction execution system, device, or device. And in some embodiments of the present disclosure, the computer readable signaling medium may include a data signal propagated in the baseband or as part of a carrier wave that carries computer readable program code. Such propagated data signals may take a variety of forms, including but not limited to electromagnetic signals, optical signals, or any suitable combination of the foregoing. Computer-readable signal medium can also be any non-transitory computer-readable medium other than computer-readable storage media, the computer-readable signal medium can send, propagate or transmit the program for use by or in combination with the instruction execution system, device or device. The program code contained on the non-transitory computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), inter-networks (e.g., the Internet), and end-to-end networks (e.g., ad hoc end-to-end networks), as well as any currently known or future developed networks.

The above computer readable medium may be contained in the above electronic device; or it may be separate and not assembled into the electronic device. The above computer readable medium carries one or more programs which, when the above one or more programs are executed by the electronic device, cause the electronic device to: slice and dice the audio to obtain a collection of speech segments and a collection of non-speech segments; determine the type and language information of each speech segment in the above collection of speech segments; for each speech segment in the above collection of speech segments, perform speech recognition on the above speech segments based on the above speech segment's For each speech segment in the above speech segment collection, based on the type and language information of the above speech segment, perform speech recognition on the above speech segment and obtain the first recognition result.

Computer program code for performing the operations of some embodiments of the present disclosure may be written in one or more programming languages or combinations thereof, said programming languages including object-oriented programming languages—such as Java, Smalltalk, C++, and also including conventional procedural programming languages—such as "C" or the like. such as "C" language or similar programming languages. The program code may be executed entirely on the user's computer, partially on the user's computer, as a stand-alone package, partially on the user's computer and partially on a remote computer, or entirely on a remote computer or server. In the case involving a remote computer, the remote computer may be connected to the user computer via any kind of network—including a local area network (LAN) or wide area network (WAN)—or, alternatively, may be connected to an external computer (e.g., using an Internet service provider to connect via the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in some embodiments of the present disclosure may be implemented by means of software or may be implemented by means of hardware. The units described may also be provided in a processor, for example, a processor may be described as comprising a cutter unit, a determination unit, and an identification unit. The names of these units do not in some cases constitute a limitation of the unit itself, e.g., the cutting unit may also be described as "a unit for cutting audio".

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

According to one or more embodiments of the present disclosure, providing an audio content recognition method, comprising: obtaining a voice fragment collection and a non-voice fragment collection by segmenting audio; determining a type and language information of each voice fragment in the voice fragment collection; and obtaining, for each voice fragment in the voice fragment collection, a first recognition result by performing voice recognition on the voice fragment based on the type and the language information of the voice fragment.

According to one or more embodiments of the present disclosure, the method described above further comprises: determining a tag of each non-voice fragment in the non-voice fragment collection; and obtaining a second recognition result by phrasing the first recognition result and the tags.

According to one or more embodiments of the present disclosure, the method described above further comprises: obtaining a video with subtitles by adding each phrase in the second recognition result to a corresponding video frame of a target video.

According to one or more embodiments of the present disclosure, wherein obtaining the voice fragment collection and the non-voice fragment collection by segmenting pre-obtained audio comprises: obtaining the voice fragment collection and the non-voice fragment collection by inputting the pre-obtained audio into a pre-trained voice activation detection model.

According to one or more embodiments of the present disclosure, wherein the types of the voice fragments comprise: at least one of an onomatopoeia voice fragment, a speaking voice fragment and a singing voice fragment.

According to one or more embodiments of the present disclosure, wherein determining the type and the language information of each voice fragment in the voice fragment collection comprises: obtaining the type of the voice fragment by inputting the voice fragment into a pre-trained activity event detection model; and obtaining the language information of the voice fragment by inputting the voice fragment into a pre-trained language identification model.

According to one or more embodiments of the present disclosure, wherein obtaining, for each voice fragment in the voice fragment collection, the first recognition result by performing voice recognition on the voice fragment based on the type and the language information of the voice fragment comprises: determining, for each voice fragment in the voice fragment collection, a voice recognition model used for recognizing voice fragments in a preset voice recognition model collection based on the type and the language information of the voice fragment; and obtaining the first recognition result by inputting the voice fragment into the voice recognition model used for recognizing voice fragments.

According to one or more embodiments of the present disclosure, wherein determining the tag of each non-voice fragment in the non-voice fragment collection comprises: obtaining the tag of the non-voice fragment by inputting each non-voice fragment in the non-voice fragment collection into a pre-trained voice event detection model.

According to one or more embodiments of the present disclosure, providing an audio content recognition apparatus, comprising: a segmenting unit, configured to segment audio to obtain a voice fragment collection and a non-voice fragment collection; a first determining unit, configured to determine a type and language information of each voice fragment in the voice fragment collection; and a recognition unit, configured to, for each voice fragment in the voice fragment collection, perform voice recognition on the voice fragment based on the type and the language information of the voice fragment.

According to one or more embodiments of the present disclosure, the apparatus further includes: a second determining unit, configured to determine a tag of each non-voice fragment in the above non-voice fragment collection; and a phrasing unit, configured to phrase the first recognition result and the above tags, so as to obtain a second recognition result.

According to one or more embodiments of the present disclosure, the apparatus further includes: an adding unit, configured to add each phrase in the second recognition result into a corresponding video frame of a target video, so as to obtain a video with subtitles.

According to one or more embodiments of the present disclosure, the phrasing unit is further configured to: input the above pre-obtained audio into a pre-trained voice activation detection model, so as to obtain the above voice fragment collection and the non-voice fragment collection.

According to one or more embodiments of the present disclosure, the types of the above voice fragments include at least one of: an onomatopoeia voice fragment, a speaking voice fragment and a singing voice fragment.

According to one or more embodiments of the present disclosure, the first determining unit is further configured to: input the above voice fragments into a pre-trained activity event detection model to obtain the types of the above voice fragments; and input the above voice fragments into a pre-trained language identification model to obtain the language information of the above voice fragments.

According to one or more embodiments of the present disclosure, the recognition unit is further configured to: for each voice fragment in the above voice fragment collection, based on the type and the language information of the above voice fragment, determine a voice recognition model used for recognizing the above voice fragment in a preset voice recognition model collection; and input the above voice fragment to the voice recognition model used for recognizing the above voice fragment to obtain the first recognition result.

According to one or more embodiments of the present disclosure, the second determining unit is further configured to: input each non-voice fragment in the above non-voice fragment collection into a pre-trained voice event detection model to obtain a tag of the above non-voice fragment.

According to one or more embodiments of the present disclosure, providing an electronic device, comprising: one or more processors; and a storage apparatus, where one or more programs are stored; wherein the one or more programs, when executed by the one or more processors, enable the one or more processors to implement any one of the method above.

According to one or more embodiments of the present disclosure, providing a non-transitory computer-readable medium, storing a computer program thereon, wherein the program, when executed by a processor, implements any one of the method above.

The above description is only a description of some preferred embodiments of the present disclosure and of the technical principles employed. It should be understood by those skilled in the art that the scope of the invention covered by the embodiments of the present disclosure is not limited to technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. An audio content recognition method, comprising:
   obtaining a voice fragment collection and a non-voice fragment collection by segmenting audio;
   determining a type and language information of each voice fragment in the voice fragment collection, wherein types of voice fragments in the voice fragment collection comprise a type of onomatopoeia voice, a type of speaking voice, and a type of singing voice; and
   obtaining, for each voice fragment in the voice fragment collection, a first recognition result by performing voice recognition on the voice fragment based on the type and the language information of the voice fragment, wherein the obtaining, for each voice fragment in the voice fragment collection, the first recognition result by performing voice recognition on the voice fragment based on the type and the language information of the voice fragment further comprises:
   determining, for each voice fragment in the voice fragment collection, a voice recognition model used for recognizing voice fragments in a preset voice recognition model collection based on the type and the language information of the voice fragment, and
   obtaining the first recognition result by inputting the voice fragment into the voice recognition model used for recognizing voice fragments.

2. The method according to claim 1, further comprising:
   determining a tag of each non-voice fragment in the non-voice fragment collection; and
   obtaining a second recognition result by phrasing the first recognition result and the tags.

3. The method according to claim 2, further comprising:
   obtaining a video with subtitles by adding each phrase in the second recognition result to a corresponding video frame of a target video.

4. The method according to claim 2, wherein determining the tag of each non-voice fragment in the non-voice fragment collection comprises:
   obtaining the tag of the non-voice fragment by inputting each non-voice fragment in the non-voice fragment collection into a pre-trained voice event detection model.

5. The method according to claim 1, wherein obtaining the voice fragment collection and the non-voice fragment collection by segmenting pre-obtained audio comprises:
   obtaining the voice fragment collection and the non-voice fragment collection by inputting the pre-obtained audio into a pre-trained voice activation detection model.

6. The method according to claim 1, wherein determining the type and the language information of each voice fragment in the voice fragment collection comprises:
   obtaining the type of the voice fragment by inputting the voice fragment into a pre-trained activity event detection model; and
   obtaining the language information of the voice fragment by inputting the voice fragment into a pre-trained language identification model.

7. An electronic device, comprising:
   one or more processors; and
   a storage apparatus, where one or more programs are stored; wherein
   the one or more programs, when executed by the one or more processors, enable the one or more processors to implement an audio content recognition method, comprising:
   obtaining a voice fragment collection and a non-voice fragment collection by segmenting audio;
   determining a type and language information of each voice fragment in the voice fragment collection, wherein types of voice fragments in the voice fragment collection comprise a type of onomatopoeia voice, a type of speaking voice, and a type of singing voice; and
   obtaining, for each voice fragment in the voice fragment collection, a first recognition result by performing voice recognition on the voice fragment based on the type and the language information of the voice fragment, wherein the obtaining, for each voice fragment in the voice fragment collection, the first recognition result by performing voice recognition on the voice fragment based on the type and the language information of the voice fragment further comprises:
   determining, for each voice fragment in the voice fragment collection, a voice recognition model used for recognizing voice fragments in a preset voice recognition model collection based on the type and the language information of the voice fragment, and obtaining the first recognition result by inputting the voice fragment into the voice recognition model used for recognizing voice fragments.

8. The electronic device according to claim 7, the audio content recognition method further comprising:

determining a tag of each non-voice fragment in the non-voice fragment collection; and obtaining a second recognition result by phrasing the first recognition result and the tags.

9. The electronic device according to claim 8, the audio content recognition method further comprising:

obtaining a video with subtitles by adding each phrase in the second recognition result to a corresponding video frame of a target video.

10. The electronic device according to claim 8, wherein determining the tag of each non-voice fragment in the non-voice fragment collection comprises:

obtaining the tag of the non-voice fragment by inputting each non-voice fragment in the non-voice fragment collection into a pre-trained voice event detection model.

11. The electronic device according to claim 7, wherein obtaining the voice fragment collection and the non-voice fragment collection by segmenting pre-obtained audio comprises:

obtaining the voice fragment collection and the non-voice fragment collection by inputting the pre-obtained audio into a pre-trained voice activation detection model.

12. The electronic device according to claim 7, wherein determining the type and the language information of each voice fragment in the voice fragment collection comprises:

obtaining the type of the voice fragment by inputting the voice fragment into a pre-trained activity event detection model; and obtaining the language information of the voice fragment by inputting the voice fragment into a pre-trained language identification model.

13. A non-transitory computer-readable medium, storing a computer program thereon, wherein the program, when executed by a processor, implements an audio content recognition method, comprising:

obtaining a voice fragment collection and a non-voice fragment collection by segmenting audio;

determining a type and language information of each voice fragment in the voice fragment collection, wherein types of voice fragments in the voice fragment collection comprise a type of onomatopoeia voice, a type of speaking voice, and a type of singing voice; and obtaining, for each voice fragment in the voice fragment collection, a first recognition result by performing voice recognition on the voice fragment based on the type and the language information of the voice fragment, wherein the obtaining, for each voice fragment in the voice fragment collection, the first recognition result by performing voice recognition on the voice fragment based on the type and the language information of the voice fragment further comprises:

determining, for each voice fragment in the voice fragment collection, a voice recognition model used for recognizing voice fragments in a preset voice recognition model collection based on the type and the language information of the voice fragment, and obtaining the first recognition result by inputting the voice fragment into the voice recognition model used for recognizing voice fragments.

14. The non-transitory computer-readable medium according to claim 13, the audio content recognition method further comprising:

determining a tag of each non-voice fragment in the non-voice fragment collection; and obtaining a second recognition result by phrasing the first recognition result and the tags.

15. The non-transitory computer-readable medium according to claim 14, the audio content recognition method further comprising:

obtaining a video with subtitles by adding each phrase in the second recognition result to a corresponding video frame of a target video.

16. The non-transitory computer-readable medium according to claim 13, wherein obtaining the voice fragment collection and the non-voice fragment collection by segmenting pre-obtained audio comprises:

obtaining the voice fragment collection and the non-voice fragment collection by inputting the pre-obtained audio into a pre-trained voice activation detection model.

* * * * *